June 24, 1969  R. S. WADLOW ET AL  3,451,276
ACTUATOR MECHANISMS

Filed Nov. 16, 1966

Inventors
Roy Sidney Wadlow
Francis Ian Victor Walker
By
Watson, Cole, Grindle + Watson
Attorneys

United States Patent Office
3,451,276
Patented June 24, 1969

3,451,276
ACTUATOR MECHANISMS
Roy Sidney Wadlow, Steyning, Sussex, and Francis Ian Victor Walker, West Chiltington, Sussex, England, assignors to F. G. Miles Engineering Limited, Shoreham-by-Sea, Sussex, England, a corporation of Great Britain
Filed Nov. 16, 1966, Ser. No. 594,791
Claims priority, application Great Britain, Sept. 20, 1966, 42,021/66
Int. Cl. F16h *21/28*
U.S. Cl. 74—50                    9 Claims

ABSTRACT OF THE DISCLOSURE

An eccentric pin mounted on a rotating cam engages a slot in a thrust ram to convert rotary motion to translational motion and maximum thrust at the initial and end portions of the stroke by the coincidence of the top and bottom dead center positions of the pin with these positions of the thrust ram, respectively. The cam's rotational movement is arrested slightly past the top and bottom dead center positions of the pin by stops that are displaced slightly more than 180° to accurately limit the stroke and to isolate the primary driving means from external loads applied to the thrust ram in its fully extended and retracted positions. The pin lies on the thrust ram's longitudinal stroke axis at both the fully retracted and extended thrust ram positions to eliminate twisting of the thrust ram.

---

This invention relates to an improved actuating mechanism for translating a rotational movement into a linear one.

Conventional linear actuators for aircraft generally consist of an extending screw ram propelled by a mating nut which is driven by an electric motor or motors via a reduction gear box. The screw thread used is usually of acme form and the efficiency of the thread is approximately 25% to 28%. The mechanical advantage is constant throughout the stroke.

In some applications the thrust required from the actuator is not constant, that is the thrust required is greatest at the beginning of the stroke due to high break-out loads which are present for various reasons. Therefore, when an actuator is selected for a duty of this type the power output is to be greater than normal in order to provide the maximum thrust required at the beginning or end of the stroke. This fact, when considered with the overall efficiency of approximately 20% to 23% for the screw ram and nut form of actuator, necessitates the provision of far more power at the actuator motor than the power required at the ram when averaged over the total stroke. The requirement for this excess power results in an actuator which is larger than would otherwise be necessary and also which requires more electric power than is desirable. A further disadvantage of the above type of actuator is that excessive loads are sometimes applied to the actuator when the latter is in either its operated or unoperated position. These excessive loads impose a severe strain on the internal mechanism in extreme cases causing damage internally.

It is therefore an object of the present invention to provide an improved actuator in which the maximum thrust available is at the beginning and end of the stroke.

A further object of the invention is to provide an actuator which effectively isolates excessive loads applied to the actuator from the mechanism operating the actuator for example, an electric motor, and its associated reduction gear.

Briefly the invention comprises an actuator having a block with a slot therein, a thrust ram connected to the block, a support plate having mounted thereon two cylindrical guide members between which the block is supported for reciprocating movement and a bearing supporting the ram, a member rotatably mounted in the plate, a pin mounted on the member eccentric to the axis of rotation thereof and engaging the slot in the block, and stop members mounted on the plate to limit the rotational movement of the member between positions past top and bottom dead center of the movement of the ram.

A preferred embodiment of the present invention will now be described with reference to the accompanying drawings in which.

Figure 1:
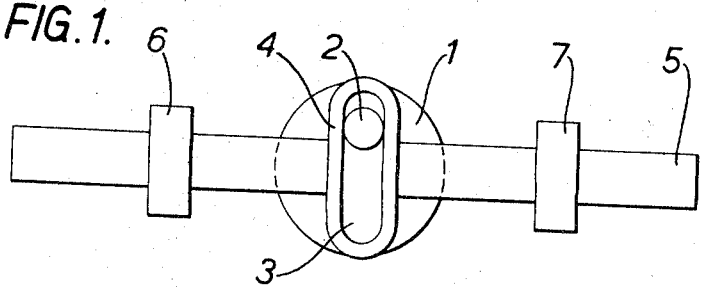
FIGURE 1 shows a simplified actuating mechanism which illustrates the principle of operation of the actuator built in accordance with the present invention shown in FIGURE 4.
Figure 2:
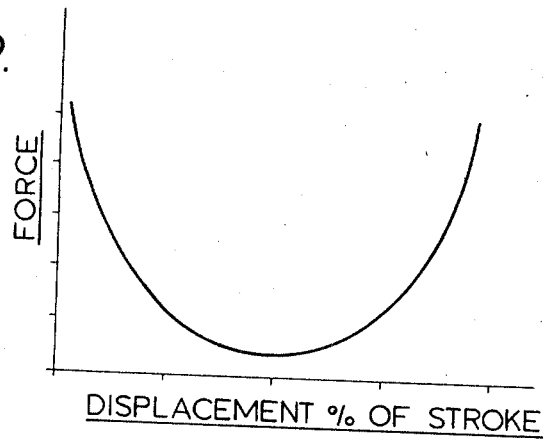
FIGURE 2 shows a graph of force versus percentage displacement of stroke of the simplified mechanism shown in FIGURE 1.

Referring now to FIGURE 1, the simplified actuator mechanism comprises a crank wheel 1 having a pin 2 which fits into a slot 3 of a cross head 4 which is integral with a thrust ram 5 carried in two bearing blocks 6 and 7. The crank wheel 1 is driven by a motor (not shown) via a reduction gear (also not shown). Rotation of the crank wheel 1 causes the cross head 4 and ram 5 to slide axially through the bearers 6 and 7. As the crank pin 2 approaches top and bottom dead center the mechanical advantage approaches infinity and a typical graph of force plotted against displacement for the thrust ram 5 is shown in FIGURE 2. The direction of rotation of the crank wheel 1 is uni-directional and a limit switch may be mounted behind the crank wheel 1 and operated by a two lobed cam driven by the gear box output shaft. The lobes are placed slightly over 180° apart for reasons which will become apparent when considering the practical construction shown in FIGURE 4. Thus the crank wheel is arrested after rotating through slightly over 180° from bottom to top dead center position of the pin 2 corresponding to the fully retracted and fully extended positions of the ram 5 to the right and left respectively as viewed in FIGURE 1 or vice-versa. The mechanical efficiency of this actuator can be as high as 85% as opposed to 23% to 25% for the actuators previously mentioned. Thus for a given power output the actuator can be made smaller and lighter than the aforementioned nut and screw ram form of actuator.

It is desirable for the ram 5 to be positioned as accurately as possible from the extended and retracted positions under a variety of different conditions; for example low temperature, low voltage and high temperature operating conditions. With the actuator shown in FIGURE 1 any overrun of the motor and hence the gear box will produce little movement of the ram 5 at the extremities of its stroke, the rotational movement of pin 2 being large compared with its projected horizontal movement of the ram 5. The motor required to operate the ram 5 need only provide unidirectional movement of its output shaft.

Figure 3:
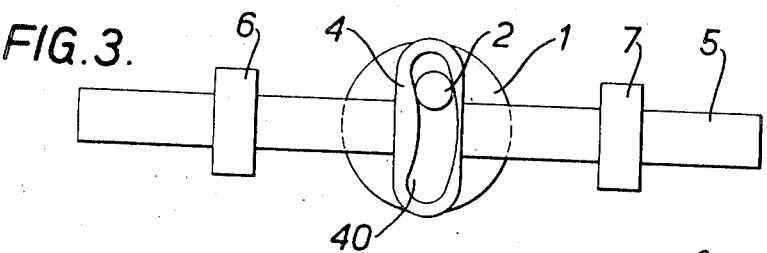
FIGURE 3 shows a modification to the simplified mechanism of FIGURE 1.
Figure 4:
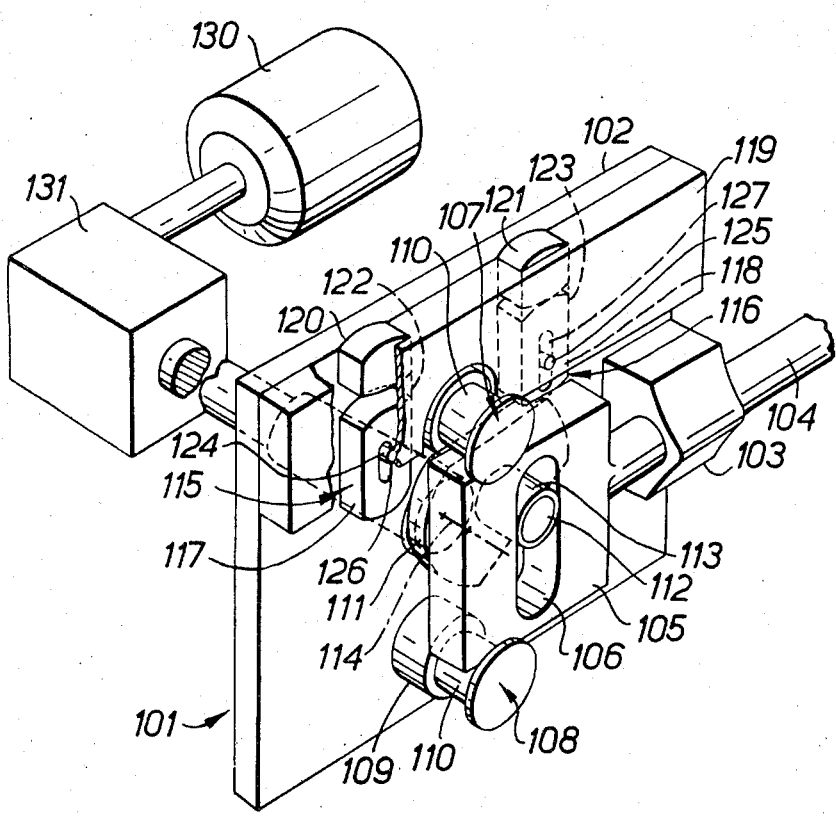
FIGURE 4 shows a preferred form of an actuator in accordance with the present invention.

If required any pattern of movement of the ram 5 in FIGURE 1 can be obtained by changing the shape of the slot 3 in the cross head 4. For example, if a longer dwell time is required in the extended position of the ram 5, that is to say when the ram 5 as shown in FIGURES 1 and 4 is in the extreme right-hand position, the right-hand side of the slot can be made to have a curve having a radius equal to that of the throw of the pin 2 as shown at 40 in FIGURE 3, like numerals identifying like parts of FIGURE 1. The left-hand side of the slot may be straight, or for ease of manufacture may have the same radius as the right-hand side of the slot.

The above is a general description of the simplified mechanism shown in FIGURES 1 and 3 and serves to explain the principles of operation of the actuator now to be described with reference to FIGURE 4.

In FIGURE 4 there is shown an actuator mechanism 101 comprising a support plate 102 having mounted thereon a bearing 103 through which passes a ram 104 secured to a rectangular block 105 having a slot 106 therein, the block being supported for reciprocating movement by two cylindrical guide members 107 and 108 each comprising a post 109 having rotatably mounted thereon a bushing 110. Behind the rectangular block 105 and rotatably supported in the plate 102 is a camming member 111 having upstanding therefrom a pin 112 rotatably supporting a bushing 113 which slides in the slot 106 of the block 105. The camming member 111 is connected to a motor 130 via a gear box 131. Thus upon rotation of the camming member 111 the pin 112 which is mounted eccentric to the axis of rotation 114 of the camming member causes the block 105 and ram 104 to reciprocate between the two guide members 107 and 108. The rotational movement of the camming member 111 is limited by two stop members 115 and 116 which comprise two rectangular metal inserts 117 and 118 slidably supported between the plate 102 and a cover plate 119, rubber or other resilient members 120 and 121 being mounted between the plate 102 and the cover plate 119 to provide shock absorption for the stop members 115 and 116 when the rotary camming member 111 comes to rest against one of the stop members. These stop members are arranged to limit the rotary motion of the camming member to just over 180°. The left-hand stop member is arranged so that the pin sliding in the slot of the rectangular block just passes bottom dead center before it is brought to rest by the camming member engaging the stop member. The right-hand stop member is likewise arranged to limit the rotational movement of the camming member to a position just over top dead center. The actuator so designed cannot over-run its predetermined stroke and in this way a high degree of accuracy of ram movement is attainable. Limit switches similar to those used in the mechanism described with reference to FIGURE 1 may also be provided to arrest movement of the motor 130 driving the camming member via the gear box 131.

By placing the motor limit switches so as to be operated by the shaft coupling the camming member 111 to the gear box 131 or by a two lobed cam coupled to the shaft, an accurate control of the ram is obtained since a small movement of the ram needs a relatively large radial movement of the shaft. The setting of the micro-switches is therefore not so critical as when they are actuated directly by the ram.

Thus considering the actuator mechanism in its operated position, the camming member is rotated through just over 180° and comes to rest against the right-hand stop member. Therefore any load applied to the thrust ram will effectively "lock" the mechanism and isolate the force applied to the thrust ram from the motor driving the rotary member.

Likewise any force applied to pull the thrust ram into its actuated position will be resisted by the pin just being over the bottom dead center position again locking the mechanism so that the force applied will not cause the camming member to rotate and will not throw a load onto the motor and gear box connected to the rotary camming member.

It will be noted from the drawing that the axis of rotation of the rotary camming member 114 is offset from the center of the slot in the rectangular block. Likewise the thrust ram is also connected to the block at a position offset from the center thereof so that in the operated and unoperated positions of the actuator the longitudinal axis of the thrust ram 120 intersects the axis of the rotary camming member. It will of course be obvious that the rotary camming member can, within limits, be rotatably mounted in the support plate at any position but to avoid a twisting movement of the block and in consequence increased friction between the block and guide members it is necessary for the thrust ram to be connected to the block so that its longitudinal axis passes through the axis of the rotary camming member in the actuated and unactuated positions of the mechanism.

The guide members and the bearing are made to provide minimum friction so that the rectangular block slides easily between the guide members and the thrust ram in its supporting bearing.

The block may be provided with an arcuate slot as described with reference to FIGURE 3 to provide a predetermined dwell time for the ram.

The preferred form of mounting the rectangular metal inserts 117 and 118 is to provide passageways 122 and 123 in the cover plate 119 to allow the inserts to slide in the passageways against the front surface of the support plate 102. Pins 124 and 125 passing through the cover and support plates 119 and 102 and through slots 126 and 127 in the inserts 117 and 118 respectively retain the latter in the passageways. Alternatively the passageways can be formed in the support plate and the latter provided with a recess to accommodate the camming member 111 and the rectangular block 105.

Since these actuators are required to work in extreme conditons of temperature and humidity it is essential that all tolerances and the rating of the motor are such to ensure that in the most adverse conditions the pin sliding in the slot in the rectangular block will always drive the ram past at least top dead center corresponding to the extended position of the ram since it is more normal for loads to be applied to the actuator ram when in the operated position than for loads to be applied in the inoperative position.

It will be appreciated from the foregoing that the disposition of the rotary member, block and ram in relation to the supporting plate may be varied in accordance with varying requirements of space and power to be transmitted by the ram. Whatever the positions of these members in relation to the ram it is essential that the block is arranged to be driven from the bottom dead center of the pin movement to provide maximum thrust at the beginning of the ram stroke to a position past top dead center of the pin movement to lock the actuator and isolate the driving motor from any loads applied to the ram tending to force it towards its inoperated position.

What we claim is:
1. A mechanical actuator, comprising:
   a support member,
   cam means rotatably mounted to said support member and including pin means eccentrically mounted thereon with respect to the rotational axis of said cam means,
   means for rotating said cam means,
   means mounted to said support member for reciprocating movement along an axis, said reciprocating means including a slot engaging said pin means,
   said support member including guide means for slidably supporting said reciprocating means, and
   stop means mounted to said support member for limiting the rotational movement of said cam means at positions beyond first and second dead center positions to isolate the means for rotating from external loads applied to the apparatus.

2. Apparatus according to claim 1 wherein said stop means includes members displaced more than 180° from each other, each of said members engaging said cam means beyond the first and second dead center positions.

3. Apparatus according to claim 1 wherein said pin means is mounted to said cam means to lie on said axis at both the first and second dead center cam positions to eliminate twisting torques on said reciprocating means.

4. Apparatus according to claim 3 wherein said guide means includes a pair of post members mounted to said support member to slidably retain said reciprocating means for movement along said axis.

5. Apparatus according to claim 1 wherein said slot is arcuately shaped to provide a dwell time for said cam means.

6. Apparatus according to claim 2 wherein said stop means includes a pair of contact members, each contact member slidably mounted to said support member and said stop means further including means for resiliently arresting the movement of each contact member on engagement therewith of said stop members.

7. Apparatus according to claim 6 further comprising means for de-energizing said drive means when said cam means passes said first and second dead center positions.

8. Apparatus according to claim 6 wherein said support member further includes a cover plate and a pair of spaced pins, said cover plate including passageways engaging said pair of contact members, each of said contact members including a slot engaging a respective pin to retain said slidable contact member in said passageway.

9. Apparatus according to claim 7 wherein said means for rotating said cam means includes a gear box having a shaft coupled to said cam means, a motor coupled to said gear box and a double lobed cam coupled to said shaft and said means for de-energizing said drive means includes a pair of limit switches operable by the lobes on said cam to de-energize said motor when the cam means reaches a position to engage said stop means.

References Cited

UNITED STATES PATENTS

| 748,236 | 12/1903 | Tuvell | 74—50 |
| 283,558 | 8/1883 | Baumgarten | 74—50 |
| 2,301,967 | 11/1942 | Nosker et al. | 74—50 |

FRED C. MATTERN, JR., *Primary Examiner.*

W. S. RATLIFF, JR., *Assistant Examiner.*